(12) United States Patent
Ryaboy

(10) Patent No.: US 6,394,407 B1
(45) Date of Patent: May 28, 2002

(54) PASSIVE VIBRATION ISOLATOR WITH PROFILED SUPPORTS

(75) Inventor: Vyacheslav M. Ryaboy, Irvine, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 09/515,377

(22) Filed: Feb. 29, 2000

Related U.S. Application Data

(63) Continuation-in-part of application No. 09/114,773, filed on Jul. 14, 1998, now Pat. No. 6,209,841.

(51) Int. Cl.[7] ............................................. F16M 1/00
(52) U.S. Cl. ...................... 248/638; 248/621; 248/634; 248/570
(58) Field of Search ................... 248/638, 550, 248/634, 636, 632, 633, 637, 560, 562, 570, 575, 609, 621; 267/136, 140.14

(56) References Cited

U.S. PATENT DOCUMENTS

| | | | |
|---|---|---|---|
| 3,442,475 A | 5/1969 | Rivin | |
| 3,460,786 A | 8/1969 | Rivin | |
| 3,578,278 A | * 5/1971 | Pickering | 248/188.3 X |
| 3,751,025 A | 8/1973 | Beery et al. | |
| 3,917,201 A | 11/1975 | Roll | |
| 3,945,246 A | * 3/1976 | Wadensten | 73/71.6 |
| 4,850,261 A | * 7/1989 | Greene | 248/638 |
| 5,000,415 A | 3/1991 | Sandercock | |
| 5,219,051 A | 6/1993 | Davis | |
| 5,251,863 A | 10/1993 | Gossman et al. | |
| 5,285,995 A | 2/1994 | Gonzalez et al. | |
| 5,327,061 A | 7/1994 | Gullapalli | |
| 5,564,537 A | 10/1996 | Shoureshi | |
| 5,653,317 A | 8/1997 | Wakui | |
| 5,660,255 A | 8/1997 | Schubert et al. | |
| 5,765,800 A | 6/1998 | Watanabe et al. | |
| 5,794,912 A | 8/1998 | Whittaker et al. | |
| 5,795,912 A | * 8/1998 | Whittaker et al. | 248/638 |
| 5,823,307 A | 10/1998 | Schubert et al. | |
| 5,941,920 A | 8/1999 | Schubert | |
| 6,022,005 A | * 2/2000 | Gran et al. | 267/136 |
| 6,209,841 B1 | * 4/2001 | Houghton, Jr. et al. | 248/550 |

OTHER PUBLICATIONS

Rivin, Eugene I., "Vibration isolation of precision equipment", Precision Engineering, 1995, pp. 41–56, vol. 17.
"Marsh Mellow Springs Vibration Isolation Design Manual", 1998, Firestone Industrial Products Company.
Rivin, Eugene I., "Shaped Elastomeric Components for Vibration Control Devices", Sound and Vibration, Jul. 1999, pp. 18–23, vol. 33, No. 7.

* cited by examiner

Primary Examiner—Ramon O. Ramirez
Assistant Examiner—Tan Le
(74) Attorney, Agent, or Firm—Irell & Manella, LLP

(57) ABSTRACT

A passive vibration isolator that contains a resilient element supported by a first support and a second support. The resilient element reacts with one or more of the supports so that the isolator has a natural frequency versus load curve. The curve has a first portion with a varying natural frequency and a second portion with a relatively constant frequency. The second support may have a profile so that a contact area of the support is approximately constant in the first portion of the curve and varies in the second portion of the curve.

3 Claims, 3 Drawing Sheets

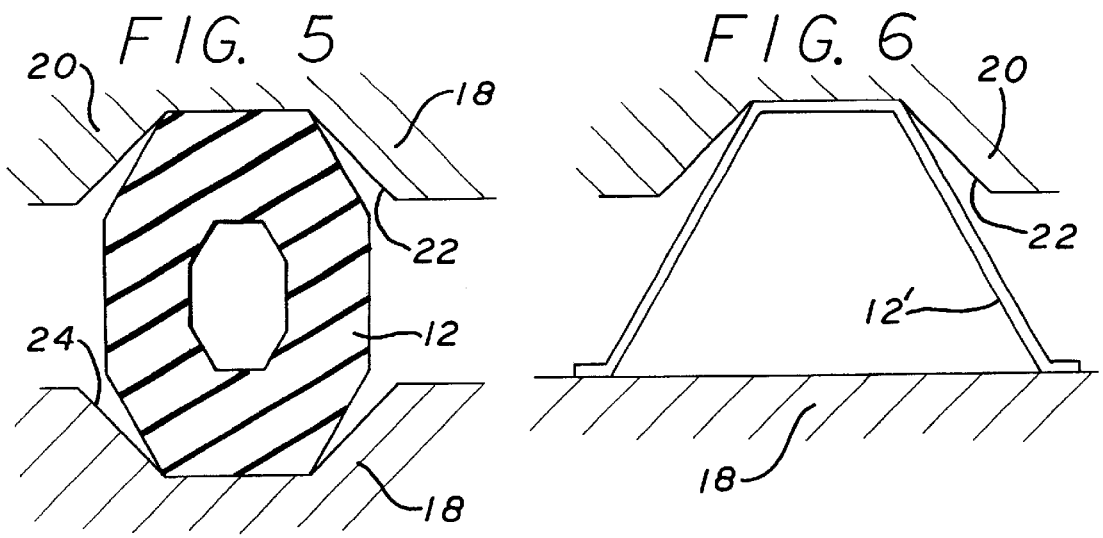
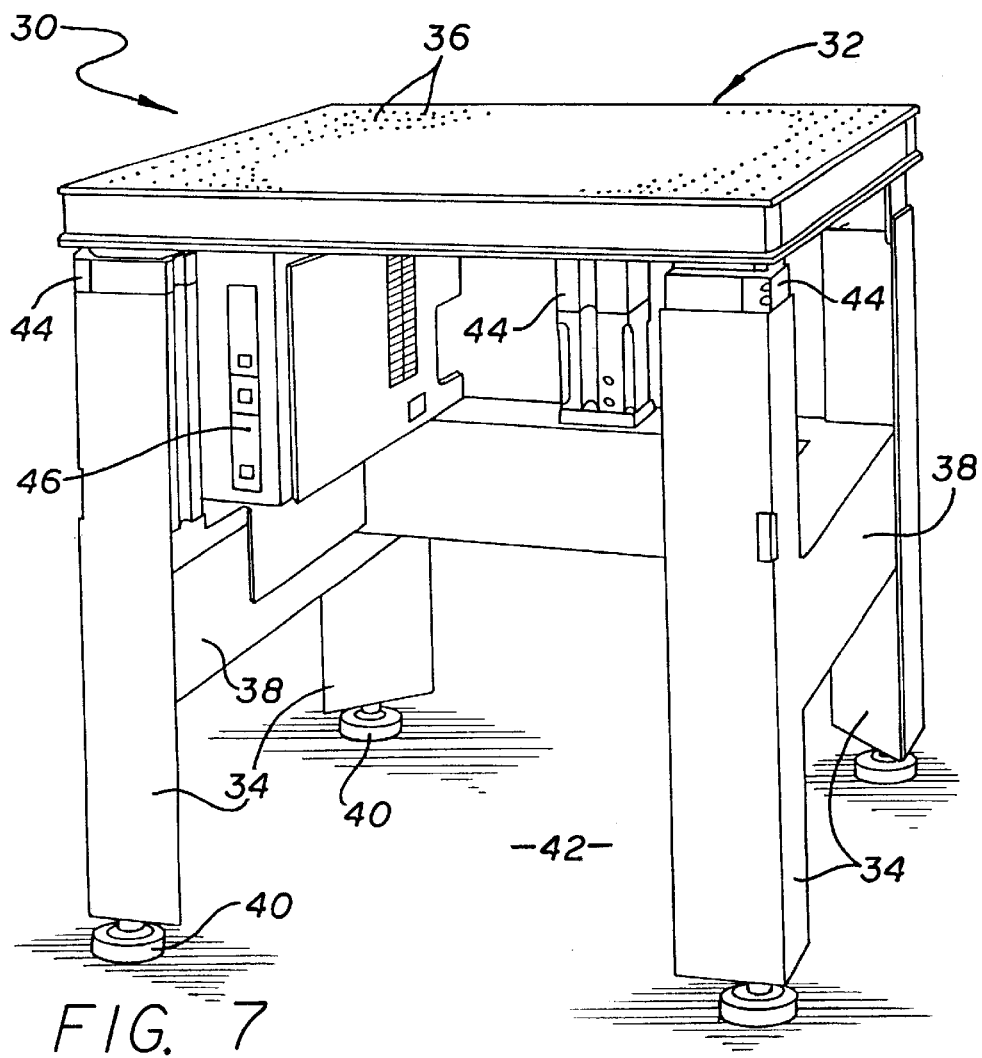

PASSIVE VIBRATION ISOLATOR WITH PROFILED SUPPORTS

CROSS-REFERENCE TO RELATED APPLICATION

The present application is a continuation-in-part of U.S. application Ser. No. 09/114,773, filed Jul. 14, 1998 is now U.S. Pat. No. 6,209,841.

BACKGROUND OF THE INVENTION

1. Field of the Invention

The present invention relates to vibration isolators.

2. Field of the Invention

The present invention relates to vibration isolators.

BACKGROUND INFORMATION

It is sometimes desirable to prevent relative movement between two surfaces. For example, integrated circuits are typically fabricated on a platform with photolithographic equipment. The location of directed light used to align and fabricate the integrated circuits must be very accurate.

The table is typically placed on the floor of a clean room. The floor may undergo vibrational movement that can be transferred to the table. The vibration may cause a displacement of the table which reduces the accuracy of the fabrication process.

Some tables incorporate vibration isolators to reduce or prevent the floor vibration from being transferred to the table. U.S. Pat. No. 5,000,415 issued to Sandercock and assigned to the assignee of the present invention, Newport Corp., discloses a vibration isolator assembly that actively isolates a load from a floor. The active isolator assembly includes a plurality of piezoelectric actuators that can vary the distance between the load and the floor surface to compensate for movement in the floor. For example, the floor may oscillate so that the floor surface moves toward the load and away from the load. When the floor moves toward the load the piezoelectric actuators contract so that the motion of the load relative to inertial space is reduced compared to that of the floor. Likewise, when the floor moves away from the load the actuators expand.

The active vibration isolator disclosed in the Sandercock patent includes a sensor that senses the movement of the floor and circuitry to provide a control loop to synchronize the contraction/expansion of the actuators with the movement in the floor. Sandercock also discloses the use of sensors which sense the velocity of the load to provide a feedback loop that is coupled to the feedforward loop.

The piezoelectric actuators and control loops are capable of isolating the load for relatively low frequencies. To roll off high frequencies, Sandercock employs an elastomeric mount that is interposed between the load and the actuators. The elastomeric mount includes an elastomer located between a pair of support plates. The elastomeric mount has a resonant frequency that varies with the weight of the load. The variation in the resonant frequency requires a calibration of the system during installation, or a reconfiguration, to compensate for a different weight of the load. The calibration or reconfiguration adds to the complexity of installing the table. It would be desirable to provide an elastomeric mount which has a resonant frequency that is relatively constant for a predetermined range of load weights to reduce the complexity of designing and installing the table.

The platform load may be large enough to buckle the elastomer within the mount. A buckled elastomer will produce inadmissibly large displacements and stresses that may cause a failure of the material and/or loss of vibration isolation. It is therefore desirable to design an elastomeric mount that has a relatively constant resonant frequency and will not buckle within the load limits of the isolator. In an article by Eugene I. Rivin, Shaped Elastomeric Components for Vibration Control Devices, Sound and Vibration, July 1999, pp 18–23, the author discusses varying the profile of the elastomer in a passive vibration isolator to obtain a resonant frequency that is relatively constant for a range of loads. Having a design iteration that varies the profile of the elastomer can be relatively expensive. It would be desirable to provide a design technique for a passive vibration isolator that allows the designer to obtain desired characteristics without varying the profile of the elastomer.

SUMMARY OF THE INVENTION

One embodiment of the present invention is a passive vibration isolator that contains a resilient element supported by a first support and a second support. The resilient element reacts with one or more of the supports so that the isolator has a natural frequency versus load curve. The curve has a first portion with a varying natural frequency and a second portion with a relatively constant frequency. The second support may have a profile so that a contact area of the support is approximately constant in the first portion of the curve and varies in the second portion of the curve.

BRIEF DESCRIPTION OF THE DRAWINGS

FIG. 5 is a diagram showing an alternate embodiment of the passive vibration isolator;

FIG. 6 is a diagram showing an alternate embodiment of the passive vibration isolator;

FIG. 7 is a perspective view of a vibration isolation table that contains the passive vibration isolator;

DETAILED DESCRIPTION

Figure 1:
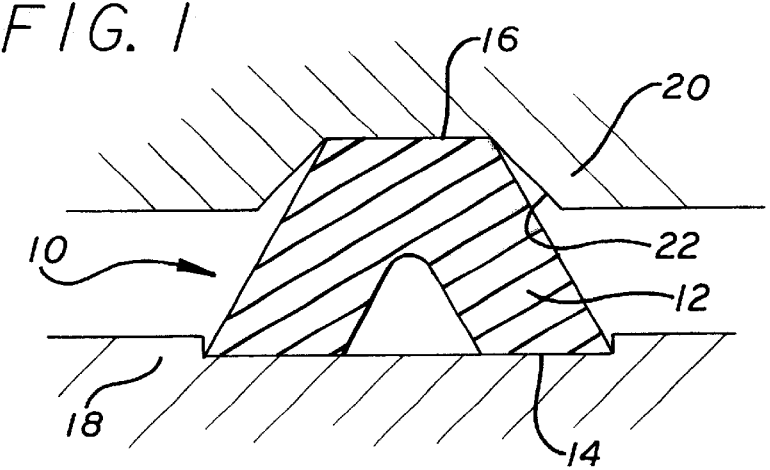
FIG. 1 is a diagram of a passive vibration isolator of the present invention.

Referring to the drawings more particularly by reference numbers, FIG. 1 shows an embodiment of a passive vibration isolator 10 of the present invention. The isolator 10 includes a resilient element 12 that has a first surface 14 and a second surface 16. The first surface 14 is attached to a first support 18. The second surface 16 is attached to a second support 20. The resilient element 12 may be constructed from an elastomeric material such as a silicon rubber. The first 18 and second 20 supports may be constructed from a rigid material such as a metal or a hard plastic. The first support 18 may be coupled to a member (not shown) that has a vibratory input such as a floor of a building structure. The second support 20 may be coupled to a device (not shown) that is to be isolated. The second support 20 may have a cavity profile 22 designed to obtain desired performance characteristics for the isolator 10.

Figure 2:
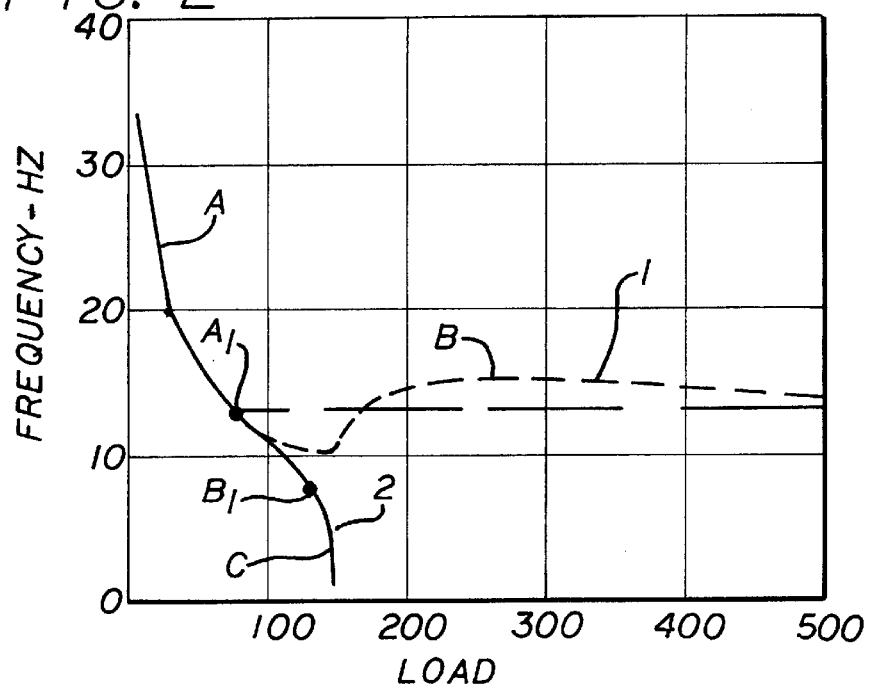
FIG. 2 is a graph showing a natural frequency versus a load f he passive vibration isolator.

FIG. 2 is graph that shows a natural frequency versus load curve (1) for the isolator. The curve has a first portion A wherein the natural frequency varies with a change in load. The curve also has a second portion B wherein the natural frequency is relatively constant with a change in load. The transition point between the first and second portions will be designated as $A_1$.

The graph also shows a curve (2) for an isolator of the prior art. The prior art curve also includes a third portion C which has a natural frequency that varies with load. This portion may correspond to an isolator that is capable of buckling at a certain point. The point at which buckling onsets is designated as $B_1$.

It is desirable to design a profile 22 that will create the curve (1) shown in FIG. 1. The profile 22 can be designed by initially selecting a profile and then create a natural frequency versus load curve for that particular design. The load curve may be created either analytically or empirically. The analytical computation can be performed with a finite element software program known in the art. If the curve does not have the desired characteristics the shape and/or dimensions of the profile can then be changed and a new curve can be created with new design. This iterative process can be repeated until the profile creates the desired natural frequency versus load curve.

Figure 3:
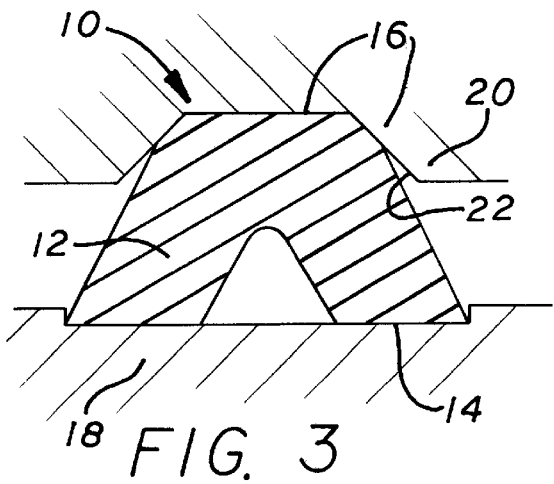
FIG. 3 is a diagram similar to FIG. 1 showing an elastomer filling a profile of a support.
Figure 4:
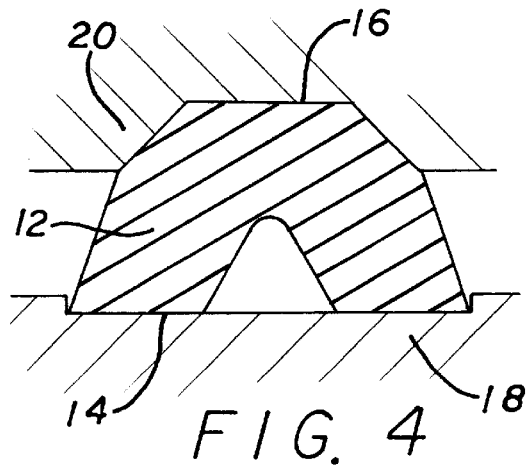
FIG. 4 is a diagram similar to FIG. 1 showing the profile filled by the the elastomer.

Referring to FIGS. 3 and 4, it may be desirable to provide a cavity profile 22 so that the contact area of the second support 20 does not increase in the first portion of the natural frequency versus load curve. It is desirable to have the resilient element 12 expand into the cavity 22 for loads that correspond to the second portion of the curve, wherein the contact area increases with load. The isolator 10 will have a relatively constant natural frequency in this area.

The contour of the cavity 22 beyond the initial contact surface 16 may be generated by means of an iterative process. The first portion of this contour beyond the surface 16 is selected so that it interacts with a deformed surface of the resilient element 12, thereby limiting its deformation and increasing its stiffness to keep the natural frequency relatively constant for some increment of load. The next portion of the contour is varied so that deformation of the resilient element may be constrained enough to keep the natural frequency relatively constant for the next increment of load. The process is continued until the entire load range is covered. This way, the contour of the cavity 22 may be constructed, for example, as a piecewise conical surface.

The isolator 10 will have a relatively constant natural frequency in the required load range. Since buckling implies diminishing the resonance frequency to zero, this will insure that buckling does not occur. The present invention provides a technique for designing a passive vibration isolator to have a desired natural frequency versus load curve without changing the profile of the damping element 12.

As shown in FIG. 5, the first support 18 may also have a cavity profile 24 that can be designed in conjunction with the first profile 22 of the second support 20 to obtain the desired characteristics.

Although an elastomeric resilient element 12 is shown and described, as shown in FIG. 6 the resilient element 12' may be a metal spring located between the supports 18 and 20. The profile 22 of the support 20 may be designed to impede the movement of the spring 12 to obtain the desired natural frequency versus load curve.

Both the resilient element 12 and the cavity 22 may have a conical shaped profile. Although a conical profile is shown and described, it is to be understood that both the cavity 22 and element 12 may have different profiles including profiles that are dissimilar from each other. As an example, the resilient element 12 and/or the cavity 22 may have domed or graduated conical shapes.

FIG. 7 shows a vibration isolation table 30 that may contain a passive vibration isolator of the present invention The table 30 may include a platform 32 that is supported by a plurality of legs 34. The platform 32 may have a honeycomb construction and include a plurality of mounting holes 36 which allow items such as optical mounts to be attached to the table 30. As an alternate embodiment, the platform 32 may be constructed from a slab of granite.

The legs 34 may be interconnected by beams 38. The legs 34 extend from a plurality of feet 40. The feet 40 are in contact with a surface 42 such as a floor of a building structure.

The table 30 may include one or more vibration isolator units 44. The isolators 44 are typically mounted to the beams 38 of the table 30, or alternatively mounted in the table legs 34. The floor may undergo a vibrational movement that creates a varying displacement of the surface 42. The isolators 44 isolate a load such as the platform 32 from the varying displacements of the surface 42.

The table assembly 30 may further include a controller 46 which controls the vibration isolators 44. The controller 46 may control all three isolators 44. Although three isolators 44 are shown and described, it is to be understood that four or any other combination of isolators 44 may be employed in the present invention.

Figure 8:
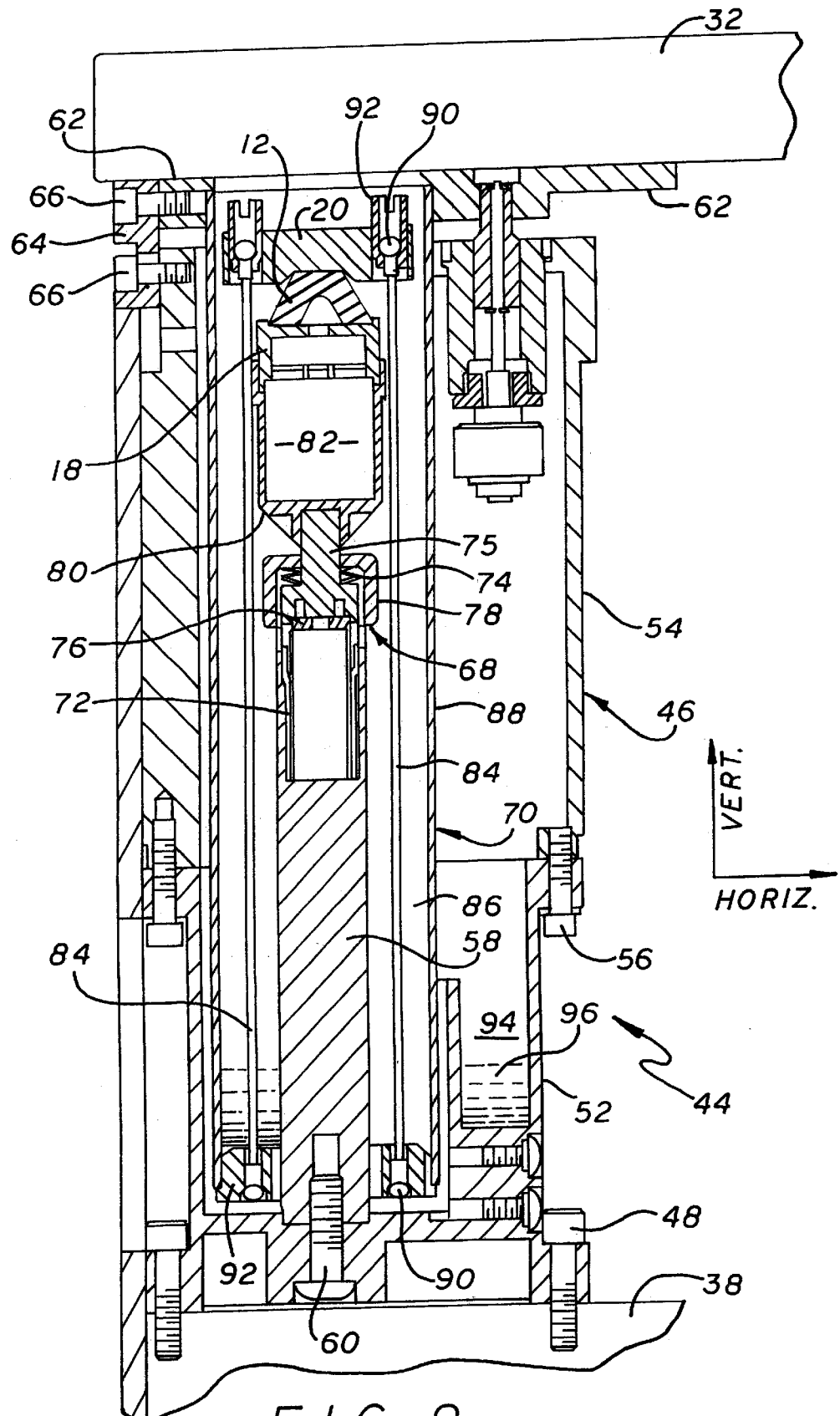
FIG. 8 is a cross-sectional view of a segment of the vibration isolation table.

FIG. 8 shows an embodiment of a vibration isolator 44. The isolator 44 may have an outer housing 46 that is mounted to a mounting surface such as a beam 38 by fasteners 48. The housing 46 may include a lower section 52 that is attached to an upper section 54 by fasteners 56. The isolator 44 may include a post 58 that is attached to the lower section 52 of the housing 48 by a fastener 60. The isolator 44 may also include a top plate 62 that supports the platform 32. When the table assembly 30 is transported, the top plate 62 and platform 32 may be secured by a locking plate 64 and fasteners 66 that screw into the plate 62 and the housing 56.

The isolator 44 may include an active isolator assembly 68 and a passive isolator assembly 70 that isolate the top plate 62 from the housing 46. The active isolator assembly 68 may isolate the plate 62 and platform 32 in a first vertical direction. The passive isolator assembly 70 may isolate the plate 62 and platform 32 in a second horizontal direction or plane.

The active isolator assembly 68 may include a piezoelectric actuator 72 that is mounted to the post 58. The piezoelectric actuator 72 may receive a drive signal that either increases or decreases the height of the actuator 72 to isolate the platform 32 in the vertical direction. The piezoelectric actuator 72 may be constructed from a plurality of piezoelectric elements which are maintained in compression by a plurality of elastic elements such as bellville springs 74. The actuator 72 also includes a push rod 75 connected to the piezoelectric elements by connecting blocks 76. The springs 74 are captured by a nut 78 that is screwed onto the post 58.

The push rod 76 is attached to a cup 80 which houses a sensor 82. The sensor 82 may be a geophone which provides an electrical output signal that is a function of the motion of the actuator push rod 76.

The isolator 44 may include the vibration isolator 10 coupled to the active isolator assembly 68 and the passive isolator assembly 70. The vibration isolator 10 may include the resilient element 12 that is attached to the first 18 and second 20 support plates. The first support plate 18 is screwed into the cup 80. The isolator 10 functions as a filter that filters out relatively high frequency vibrations introduced to the isolator 44 so that high frequency components are not transferred from the floor 42 to the plate 62 and platform 32. This reduces the requirements for active system bandwidth. The constant frequency characteristics of the isolator 10 reduces the calibration and reconfiguration required to install the table 30.

The passive isolator assembly 70 may include a plurality of cables or other tension members 84 that extend along an inner channel 86 of a tube 88. The tube 88 is in contact with the top plate 62. The bottom ends of the cables 84 each have knobs 90 that are captured by an end plate 92. The end plate 92 is attached to the tube 88. The top end of the cables 84 have knobs 90 that are captured by cable plugs 92 which are screwed into the second support 20. The cables 84 create a pendulum assembly which allows the top plate 62 and tube 84 to translate horizontally about the post 58.

The lower housing section 52 may include a reservoir 94 that is filled with a fluid 96 such as oil. A portion of the tube 88 extends into the reservoir 94. The fluid filled reservoir 94 creates a dashpot that damps horizontal movement of the plate 62.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for designing a vibration isolator, comprising:

generating a natural frequency versus load curve for a resilient element that has a first surface supported by a first support and a second surface supported by a second support, the natural frequency versus load curve has a first portion at which the natural frequency versus load is varying and a second portion wherein the natural frequency is relatively constant; and, modeling a profile of the second support so that a contact area of the second support is approximately constant in the first portion of the natural frequency versus load curve and varies in the second portion of the natural frequency versus load curve.

2. The method of claim 1, wherein the profile is varied in an iterative process so that the contact area of the second support is approximately constant in the first portion of the natural frequency versus load curve and varies in the second portion of the natural frequency versus load curve.

3. The method of claim 1, wherein the profile of the second support has a conical shape.

\* \* \* \* \*